Jan. 17, 1961 T. MARINER 2,968,327
METHOD OF IMPROVING THE SOUND ABSORPTION EFFICIENCY
OF PERFORATED POROUS ACOUSTICAL MATERIALS
Filed June 18, 1957 3 Sheets-Sheet 1
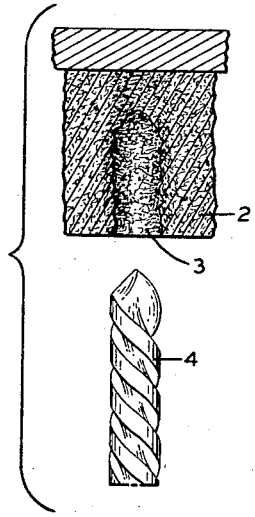
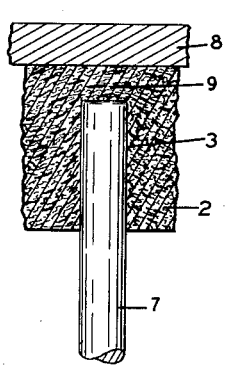
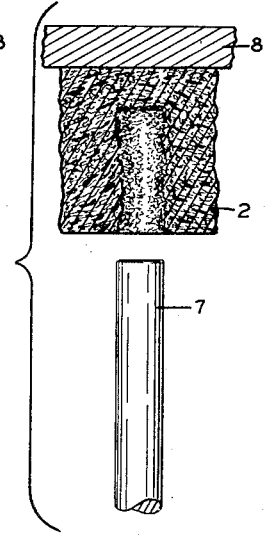
INVENTOR
THOMAS MARINER
ATTORNEY Jan. 17, 1961 T. MARINER 2,968,327
METHOD OF IMPROVING THE SOUND ABSORPTION EFFICIENCY
OF PERFORATED POROUS ACOUSTICAL MATERIALS
Filed June 18, 1957 3 Sheets-Sheet 2

INVENTOR
THOMAS MARINER

ATTORNEY

Jan. 17, 1961  T. MARINER  2,968,327
METHOD OF IMPROVING THE SOUND ABSORPTION EFFICIENCY
OF PERFORATED POROUS ACOUSTICAL MATERIALS
Filed June 18, 1957  3 Sheets-Sheet 3
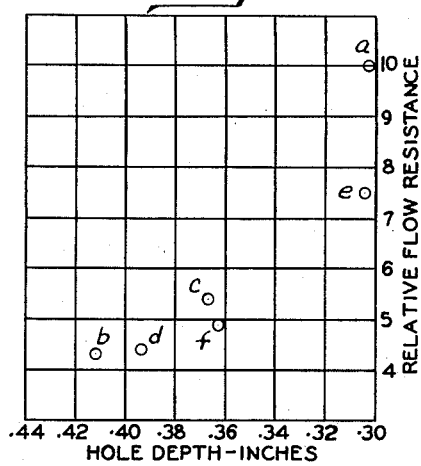
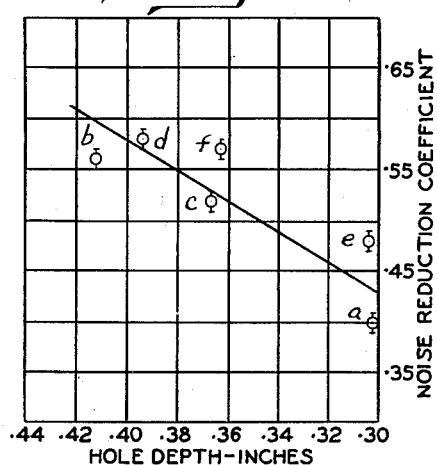
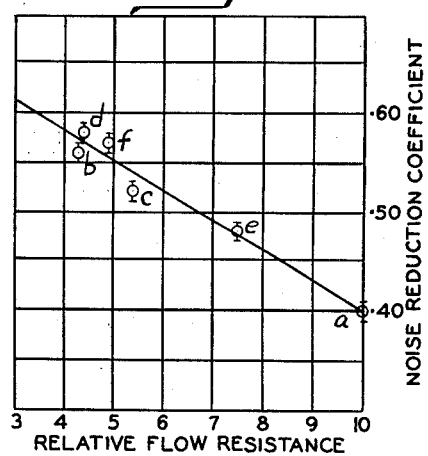
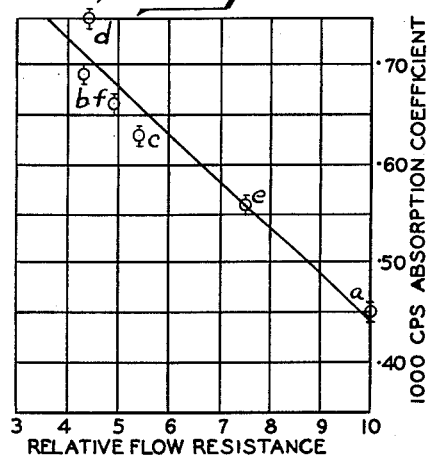
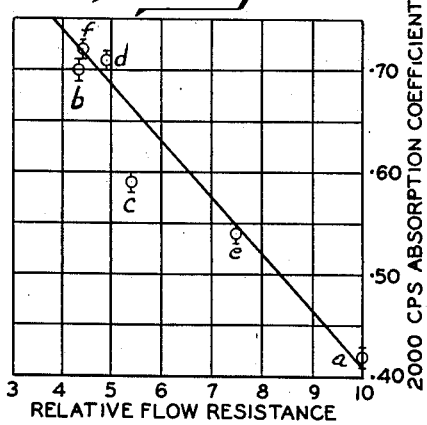
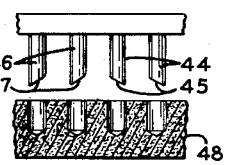
INVENTOR
THOMAS MARINER
ATTORNEY

United States Patent Office 2,968,327
Patented Jan. 17, 1961

2,968,327

METHOD OF IMPROVING THE SOUND ABSORPTION EFFICIENCY OF PERFORATED POROUS ACOUSTICAL MATERIALS

Thomas Mariner, Mount Joy, Pa., assignor to Armstrong Cork Company, Lancaster, Pa., a corporation of Pennsylvania Filed June 18, 1957, Ser. No. 666,368

11 Claims. (Cl. 144—322)

This invention relates to a method of improving the sound absorption efficiency of perforated porous acoustical materials. It is concerned more particularly with improvement of drilled fiberboard type acoustical tiles.

One of the most extensively used materials for sound absorption and acoustical correction is a drilled fiberboard product. This product is prepared by first forming a sheet of an open porous character from wood or other cellulosic fibers. The sheet is then cut into tiles of the desired size, say 12" x 12" x ½" or ¾" thick, and these tiles are then drilled with a multiple spindle drill to provide a plurality of openings which extend from the upper surface of the tile toward the back surface. These openings normally do not extend completely through the tile. For example, the product may have about 484 holes of 3/16" diameter drilled therein on ½" centers, using generally conventional twist drills to form the openings. The product usually is finished with paint, generally applied before the tiles are drilled.

The sound-absorbing efficiency of porous acoustical tiles will vary, depending upon a number of factors. Principally, there are two fundamental physical mechanisms by which such porous perforated acoustical materials can remove energy from sound waves impinging thereon. The one mechanism, called mechanical absorption for brevity, and the lesser important of the two, involves flexural motion of the acoustical tile excited by the oscillatory pressure of the sound waves. Owing to internal friction in the solid matrix of the acoustical material, some of the flexural motional energy is converted into heat, so that the moving tile returns to the sound field less energy than it receives from the sound field, and sound absorption results. The other mechanism, called viscous absorption for brevity, and by far the more important of the two, involves flow of air into and out of the pores of the tile as a result of the oscillatory pressure of the sound waves. Since air has viscosity, flow of air into the porous material results in the production of heat, an equivalent amount of energy being removed from the impinging sound wave. Viscous absorption accounts for the major portion of sound reduction in porous fibrous acoustical materials.

This viscous absorption in a perforated porous material is influenced by a number of parameters. These include porosity; air flow resistance; diameter, depth, and spacing of perforations; thickness of the material; and depth of the air space behind the tiles, especially if the tiles have permeable backs. Thus, it is possible, theoretically, by adjustment of fiber diameter or fiberboard density, or both, to obtain the optimum air flow resistance for any given acoustical product; and, since the other important parameters may be constant, such as porosity of the board and the thickness of the board, and the diameter, depth, and spacing of the perforations, it is possible by such adjustment of air flow resistance to control the absorption coefficients of the product at various sound frequencies, such as 250, 500, 1000, and 2000 cycles per second.

However, since the fiber furnish which is normally used in the preparation of fiberboards for fabrication into acoustical tiles is most commonly mass produced for general insulating purposes, including building sheathing insulation, roof deck insulation, decorative panels and planks, as well as blanks for use in the fabrication of acoustical tiles, it is not convenient or practical to adjust the fiber size and density of the base product to provide the optimum air flow resistance characteristics for specific sound absorption products to be fabricated from the base board.

An object of the present invention, therefore, is to provide a method of improving the sound absorption efficiency of perforated fibrous acoustical materials by decreasing the air flow resistance of the perforated porous product without adjustment of fiber size or density of the base board. Thus, with fiber diameter, density of the base board and porosity unadjusted and with the thickness of the base board and the diameter, depth, and spacing of the perforations maintained essentially constant, as they may be conveniently, adjustment of the remaining important parameter, namely air flow resistance, to reduce the total air flow resistance to the desired value will improve the acoustical efficiency of the product.

According to the present invention, the air flow resistance of a perforated fibrous acoustical material, such as the fiberboard acoustical material referred to above, is adjusted by disrupting the fibrous structure of the material in the region of the perforations. The disruption of the fibrous structure of the material is achieved by mechanically delaminating the fibrous structure of the material in areas between the perforations to provide openings extending laterally from the perforations for air flow. This controllably reduces the air flow resistance of the product and makes possible the attainment of improved sound absorption efficiency.

Other objects of the invention will be clear from the following detailed description of the invention, reference being made to the attached drawings, in which:

Figure 1 is a longitudinal sectional view of a piece of perforated fibrous acoustical material having a plurality of drilled openings provided therein;

Figures 2, 3, and 4 are diagrammatic views to an enlarged scale illustrating a series of steps carried out in the performance of the process;

Figures 7-11 are graphs which chart hole depth against relative flow resistance and hole depth and relative air flow resistance against noise reduction and absorption coefficients, as noted on the graphs; and Figure 12 is a sketch which illustrates a form of punching unit.

Figure 5:
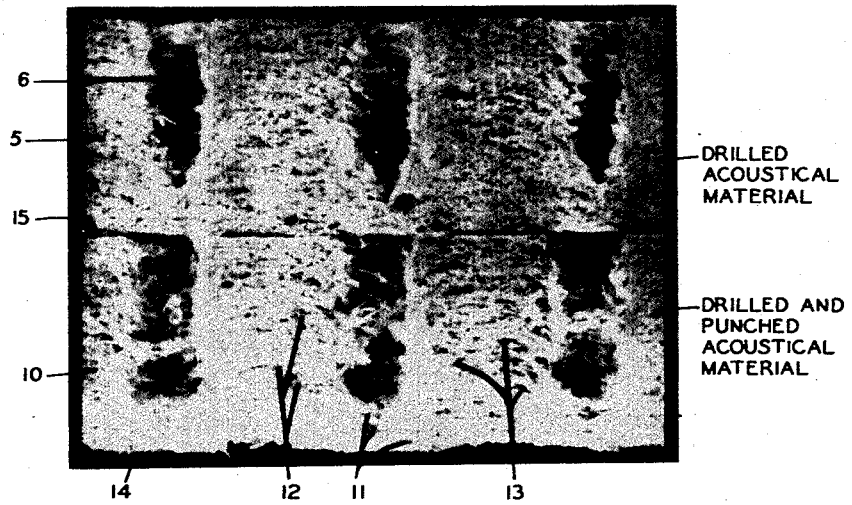
Figure 5 is a reproduction of a photograph to a magnified scale showing small portions of two pieces of fibrous acoustical material and illustrating the change in physical characteristics of the acoustical material resulting from practice of the method.

Referring to the drawings, there is shown in Figure 1 an acoustical tile 2 which may be formed of wood fibers generally as disclosed in Scott Patent 2,642,359. The fibers are disposed generally parallel to the flat face of the tile. For purposes of illustration, it will be assumed that the tile is 12" x 12" x ½" thick and is provided with 22 rows of holes 3/16" in diameter and about .30" to about .41" deep (see Table II which follows), there being 22 holes in each row. The board thus will have 484 holes of substantially uniform depth and substantially uniform spacing extending from the face of the tile toward the back but not completely through the tile.

The holes 3 in the board 2 may be provided by drilling the board with twist drills 4, as diagrammatically shown in Figure 2. An attempt has been made in Figure 2 to show the generally parallel relationship of the wood fibers in the tile. Figure 5, which is a reproduction of an actual photograph of two pieces of fibrous acoustical material ½" thick, better illustrates the general arrangement of the fibers.

It will be observed by reference to the upper portion of Figure 5, which shows a small section of a piece of fibrous acoustical material 5 upon completion of the drilling operation, that the holes 6 are not sharp, clean, or well-defined interiorly of the board. This is inevitable where an open porous fibrous material, such as fiberboard, is drilled with conventional twist drills.

The next step in the process is illustrated in Figure 3 where there has been diagrammatically shown a punch member 7 which has been thrust into the drilled opening 3 in the fiberboard 2 supported on a backing plate 8. The punch 7 has been impacted against the material 9 at the bottom of the drilled opening 3. For purposes of illustration, assuming the acoustical material 2 to have been drilled with twist drills 3/16" in diameter, the punch 7 may be 5/32" in diameter. Now, by reference to the lower portion of Figure 5 which shows a small section of a piece of fibrous acoustical material 10 after punching, it will be observed that by thrusting the punch into the drilled opening there results not only a reorientation of many of the fibers which project into the drilled opening but also a delamination of the board in the regions surrounding the opening and at the bottom thereof. This provides openings extending laterally from the perforations and therebelow as has been indicated by the numerals 11, 12, and 13 in Figure 5. It will be noted that there has been a general disruption or forcing apart of the fibrous structure and that many of the bundles of fibers have been displaced from their normally flat and parallel relationship with the major faces 14 and 15 of the material and are now in a curved condition. Figure 4 diagrammatically illustrates the alteration of the fiber structure upon withdrawal of the punch 7.

The punching operation may be performed manually; but for mass production, it is desirable to mount a plurality of the punches on a supporting head and to insert them simultaneously into a plurality of the drilled openings in the board. It is preferred to provide a mounting plate to which are attached punches for each of the drilled openings to be treated. This may be effected conveniently by use of a punch press, with the board supported by the platen of the press and the punches being carried on the head of the press, with suitable guiding arrangements to insure proper entry of the punches into the drilled openings in the board. Somewhat greater disruption of the fibrous structure may be secured with less pressure if the drilled board is positioned on a rubber or fiberboard support during punching, but this may result in some deformation of the rear surface of the product and, if that is objectionable, a rigid support will be used. A rigid support will require less accuracy in control of the pressure applied in punching, and that may be a production advantage of some significance.

The reduction in air flow resistance thus achieved may be controlled by adjustment of the depth of penetration of the punches into the perforated tile, the size of the punches with respect to the diameter of the drills used in forming the perforations, the number of punches used in relation to the total number of perforations in the tile, and other variable factors, all of which affect the extent of the disruption of the fiber structure of the product. Generally, each of the holes will be treated, and usually the punch or punches will be round in cross section and of slightly lesser diameter than the diameter of the drills used in forming the perforations, and the punches will be brought to a position below the average normal depth of the drilled openings to insure delamination of the fibrous structure not only in the areas surrounding the openings but also in the regions below the openings. Thus, the desired air flow resistance to achieve efficient sound absorption in a given perforated porous acoustical product may be obtained. Of course, the air flow resistance can be reduced below the optimum value, and that factor must be taken into consideration. This may be of greater significance with the thicker sound-absorbing materials, such as ¾" and 1" thick fiberboard acoustical tiles, which normally are manufactured to a lower bulk density and where, accordingly, a lesser change in air flow resistance generally will be required to obtain the desired sound-absorbing efficiency, than in the corresponding product ½" thick. Also, the optimum air flow resistance varies for maximum sound absorption efficiency at different frequencies. For example, the optimum flow resistance value for maximum sound absorption efficiency at 2000 cycles per second in a perforated 1" fiberboard acoustical tile may be higher than for maximum sound absorption at 500 or 1000 cycles per second. Where absorption over a range of frequencies is considered, as 250 to 2000 cycles in determining noise reduction coefficient, the optimum air flow resistance may be another value. All of these factors will be taken into account in arriving at the air flow resistance value to be sought in any given acoustical material.

The following table illustrates the reduction in air flow resistance and improvement in sound absorption efficiency of the material which has been illustrated in Figure 5. The drilled material was ½" "Cushiontone," a wood fiberboard acoustical tile having 484 holes in a 12" x 12" tile, factory drilled with 3/16" twist drills in 22 rows of 22 holes each. This drilled material is identified by No. 57 in Table I. The material, after machine punching with 5/32" pins, all 484 holes being punched at one time with a pressure application of 40,000 pounds on a Baldwin Southwark press, is identified by No. 58 in Table I. (The same material also appears as specimens c and d in Table II which follows later in this specification.)

Table I

| Specimen No. | Reverberation Room Sound Absorption Coefficients | | | | | Flow Resistance Kg.-Secs. | Hole Depth |
| --- | --- | --- | --- | --- | --- | --- | --- |
| | 250 [1] | 500 [1] | 1,000 [1] | 2,000 [1] | NRC [2] | | |
| 57 | .21 | .64 | .63 | .59 | .52 | 5.4 | .367 |
| 58 | .18 | .65 | .75 | .72 | .58 | 4.4 | .394 |

[1] Cycles per second.
[2] Noise reduction coefficient.

It will be noted that the flow resistance of the material was decreased from 5.4 to 4.4 by punching after drilling and that the noise reduction coefficient of the material was increased from .52 to .58. Significant improvements in absorption coefficients were obtained at 1000 and 2000 cycles per second. At these higher frequencies, viscous absorption is more pronounced. At the lower frequencies, 250 and 500 cycles per second, flow resistance does not have a strong influence.

Figure 6:
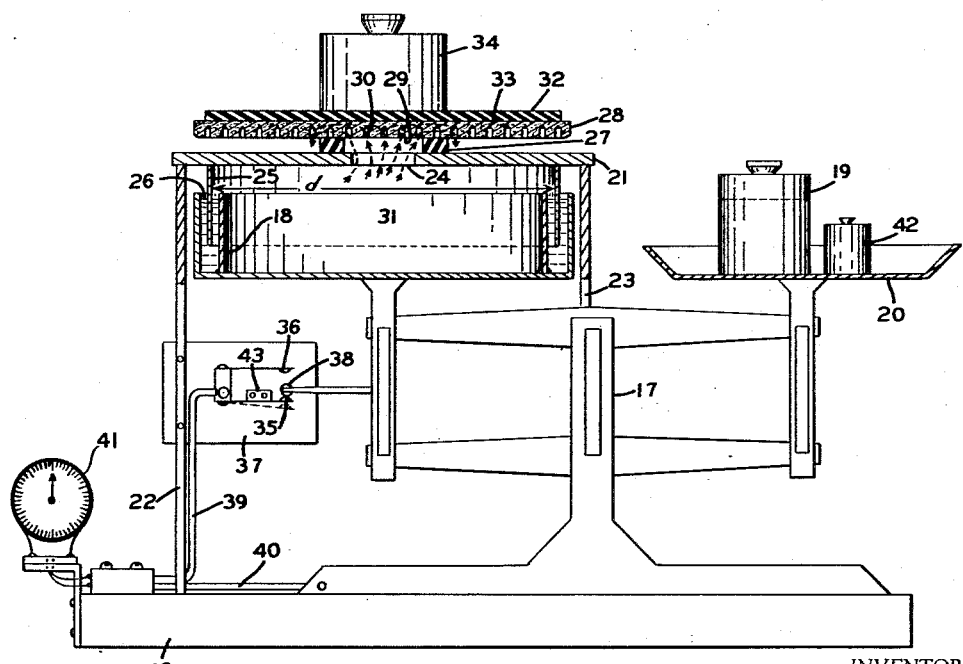
Figure 6 is a diagram showing a system for determining air flow resistance of acoustical materials.

In determining flow resistance, the apparatus shown in Figure 6 may be employed.

Air flow resistance is measured by the air pressure differential required to produce a specified rate of flow of air through a porous material. Textbooks (vide: Acoustic Measurements, L. L. Beranek, John Wiley and Sons, Inc., 1949) described methods of measuring the specific air flow resistance per centimeter thickness, which in the domain of acoustics is analogous to the specific electrical volume resistivity in the domain of electricity.

In the case of perforated acoustical materials, however, it has been found that the specific air flow resistance of the base board is an inadequate indication of the resistive properties of the finished product and that the sound absorptive properties of the finished product are more closely correlated with the relative resistance to flow of air into the perforations and then laterally through the body of the board.

An apparatus for making relative air flow resistance measurements is shown in Figure 6. The apparatus includes a base member 16 upon which is mounted a laboratory torsion balance 17, one pan of which has been replaced by an annular oil reservoir 18 forming part of a liquid seal. The weight of this reservoir and the oil is offset by a counterbalance weight 19 disposed in the pan 20 of the balance.

A specimen support 21 is mounted in fixed position with respect to the base 16 by frame members 22 and 23 which project upwardly from the base. The plate 21 is provided with a centrally located large hole 24 which may be about 2″ in diameter. A cylindrical sealing fin 25 projects downwardly from the specimen support 21 and terminates below the level 26 of the oil in the reservoir 18. The diameter of the fin 25 has been indicated by the letter $d$ and is measured in centimeters.

A soft rubber sealing ring 27 having an inside diameter of $2\frac{7}{16}''$ and an outer diameter of about $3\frac{15}{16}''$ and about $\frac{1}{2}''$ thick is disposed between the supporting plate 21 and a specimen 28 to be measured. The specimen 28 is mounted as shown in the drawing, with the face 29 of the specimen having perforations 30 therein facing air chamber 31 defined by the reservoir 18, the supporting plate 21, the sealing fin 25, and the oil surface 26.

A rubber sealing mat or pad 32 is disposed to cover the rear surface 33 of the specimen 28 to prevent the flow of air through the back of the specimen. A two kilogram weight 34 is positioned on the sealing pad 32 to insure tight seals between the pad 32, specimen 28, sealing ring 27, and mounting plate 21.

Electrical contacts 35 and 36 are mounted on arms of a spring material, such as Phosphor bronze, which arms are secured to an insulating mounting plate 37 which is in turn secured to frame member 22. The arm which carries contact 35 is deflectable from the solid line position to the dotted line position shown in Figure 6. A movable contact 38 is attached to balance arm. Lines 39 and 40 connect contacts 35 and 36 and movable contact 38 (through the balance) to controls for an electric clock 41 which are arranged to start the clock 41 when contact 38 breaks with contact 35 and to stop the clock 41 when contact 38 makes engagement with contact 36. This will measure the time $t$ (seconds) for a vertical deflection $l$ (centimeters) of the balance arm (from break position of contacts 35 and 38 to make position of contacts 36 and 38) when a weight 42 of fixed value $W$ (grams) is applied to the pan 20 of the torsion balance. The torsion balance is first adjusted to a balanced condition by application of counterweight 19 which, as indicated by the dotted line in Figure 6, is divided into two parts. The upper portion of the counterweight 19 is then removed, and the excess weight on the opposite side of the balance causes the balance to deflect downwardly on that side, bringing movable contact 38 into engagement with contact 35 and deflecting it to the dotted line position.

Measurement of air flow resistance is then determined by applying a weight 42 (together with the upper portion of the counterweight 19) to the pan 20, the weight 42, representing an excess weight $W$ grams and an excess pressure $$p = \frac{4Wg}{\pi d^2} \text{ dynes/cm.}^2$$

is developed in air chamber 31, causing air to flow, substantially in the paths indicated by arrows, into the perforations 30 of the specimen face 29 exposed within the sealing ring 27, laterally through the walls of the perforations, through the body of the specimen, and thence to the atmosphere through the perforations lying outside the sealing ring. As the air is exhausted from the air chamber 31, the oil reservoir 18 and the balance arm with the movable electrical contact 38 rise and the arm which carries contact 35 returns to its solid line position in engagement with a stop 43 of insulating material attached to support 37. Thereupon, movable contact 38 leaves contact 35 and balance arm moves the distance of vertical deflection $l$, bringing movable contact 38 into engagement with contact 36. Clock 41 starts when contact 38 leaves contact 35 and stops when contact 38 engages contact 36. Thus, the clock 41 records the time $t$ seconds for flow of a volume of air $$V = \frac{l\pi d^2}{4}$$

cubic centimeters. The volume rate of flow is $$\frac{V}{t} = \frac{l\pi d^2}{4t}$$

The effective flow resistance for the particular arrangement of the specimen is $$R = \frac{P}{V/t} = \frac{16Wgt}{\pi^2 d^4 l}$$

acoustic ohms. Since the term $$\frac{16g}{\pi^2 d^4 l}$$

is a characteristic constant of the apparatus, the flow resistance measurements are proportional to the product $Wt$. This is called the relative flow resistance in gram-seconds. For a convenient scale of numbers, this is converted to $$\frac{Wt}{1000}$$

giving the relative flow resistance in kilogram seconds. These are the figures used in this specification.

In the apparatus illustrated in Figure 6, $d = 19$ centimeters, $l = .729$ centimeter, and the characteristic constant is $$\frac{16g}{\pi^2 d^4 l} = .0165$$

Referring again to Table I, it will be noted that the hole depth on the average was increased from .367″ to .394″ by the punching operation. While hole depth does effect sound absorption efficiency, it readily can be established that with a given group of tiles, similar in all important parameters except flow resistance and hole depth, the differences in absorption coefficients are principally the result of the differences in flow resistance. The following table lists the physical data for six specimens of "Cushiontone" $\frac{1}{2}''$ thick having 22 rows of $\frac{13}{16}''$ diameter holes, each row having 22 holes. These specimens were subjected to a reverberation room test for sound absorption coefficients using mounting No. 1 (test pieces lying in edge-to-edge relationship on a concrete floor.)

Figure 7 is a plot of flow resistance versus hole depth for Table II tiles. The apparent functional relationship between hole depth and flow resistance has no fundamental significance, since the same hole depth could be drilled in boards of different flow resistances. That is, hole depth and flow resistance are essentially independent variables. However, an accidental relationship between the two variables is understandable in that manufacturing variables which tend to increase flow resistance, such as the use of dull twist drills which tends to pack the fibers in the periphery of the holes, dense boards, and the like, may also tend to decrease hole depth.

In Figure 8 are plotted the noise reduction coefficients (NRC's) of the Table II tiles versus hole depth. An apparent relationship exists, but the location of the datum points suggests that the accidental relationship arises from

Table II

| Specimen | Drill Type | Reverberation Room Sound Absorption Coefficients | | | | | Relative Flow Resistance | Hole Depth, Inches |
|---|---|---|---|---|---|---|---|---|
| | | 250 [1] | 500 [1] | 1,000 [1] | 2,000 [1] | NRC [2] | | |
| a | Twist | .22 | .49 | .45 | .42 | .40 | 10.0 | .303 |
| b | Twist | .24 | .63 | .69 | .70 | .56 | 4.3 | .412 |
| c | Twist | .21 | .64 | .63 | .59 | .52 | 5.4 | .367 |
| d | Sample c punched | .18 | .65 | .75 | .72 | .58 | 4.4 | .394 |
| e | Tubular | .26 | .58 | .56 | .54 | .48 | 7.5 | .304 |
| f | Ship Auger | .24 | .66 | .66 | .71 | .57 | 4.9 | .363 |

[1] Cycles per second.
[2] Noise reduction coefficient.

the association of hole depth with flow resistance, as shown in Figure 7. The fit of the points in Figure 8 is not very good. It will be noted, moreover, that specimens a and e have essentially the same hole depth but have quite different NRC's. Sample e, which has the higher NRC, has the lower flow resistance, as seen in Figure 7. Similarly, specimens c and f have essentially the same hole depth, but significantly different NRC's the higher NRC again being associated with the sample having the lower flow resistance.

These observations suggest that hole depth is not the dominant variable and that a more coherent interpretation of data would be obtained by plotting NRC against flow resistance, as has been done in Figure 9. Samples b and f, having nearly the same flow resistance and quite different hole depths (Figure 7), are grouped close to the curve in Figure 9. Samples a and e, which have the same hole depth (Figure 7) but quite different flow resistance, also fit the curve in Figure 9, the higher NRC being associated with the lower flow resistance. A similar comparison may be made between samples c and f. These observations indicate that flow resistance dominates over hole depth in establishing the NRC's of the Table II tiles.

Considering now in more detail the influence of flow resistance on the absorption coefficients at individual frequencies, the data for 250 cycles per second as shown in Table II leads to the conclusion that neither hole depth nor flow resistance has a strong influence at this frequency.

At 500 cycles per second, it will be noted that samples a and e, Table II, having about the same hole depth, have quite different absorption coefficients. There is, however, a much better correlation between absorption coefficients and flow resistances. The similar absorptive properties of samples b and f are now understandable in terms of nearly equal flow resistances, and the radically different absorptive properties of a and e are explained by their quite different flow resistances.

Figures 10 and 11 are plots of sound absorption data for Table II tiles at 1000 and 2000 cycles per second, comparing relative flow resistance with absorption coefficient. Without repetition of the detailed arguments already invoked at other frequencies, it is apparent from the data of Table II that unreasonable relationships between samples exist in absorption coefficients versus hole depth, whereas the datum points in Figures 10 and 11 are reasonably related in the plot of absorption versus flow resistance. It will be observed that sample d does not fit the flow resistance plot of Figure 10 so well as the other points. Reference to Table II shows specimen d to have been prepared by punching tile c to reduce the flow resistance. It is thus indicated that reduction of localized flow resistance by punching tiles of the Table II type results in a greater improvement of the absorption coefficient at 1000 cycles per second than would be obtained by an equivalent reduction of the distributed flow resistance. It may be possible that part of the distinction between drilled tiles and drilled and punched tiles of the same flow resistance is due to increase in mass reactance and lowering of the resonant frequency for viscous absorption in the drilled and punched tiles.

Good correlation between absorption coefficient and flow resistance is indicated by the relatively good fit of points in Figure 11, even though point c does not fit so well as might be desired. In Figure 11, specimens b and f have quite different hole depths but essentially the same absorption coefficient, and samples a and e have the same hole depth, but quite different absorption coefficients, again indicating clearly that hole depth is not a dominant parameter in comparison with the effect of changes in flow resistance as discussed above. The minor variations in hole depth in commercially produced drilled fibrous acoustical tiles do not have any significant effect on flow resistance.

While the invention has been described with particular reference to the drilling and punching of ½" thick wood fiber acoustical material, the invention is applicable to other materials and to acoustical materials of various thicknesses. While it is generally possible to adjust the air flow characteristics of mineral fiber acoustical materials during fabrication of the blanks, since they are usually fabricated specifically for acoustical purposes and not for general insulation purposes, as is common practice with fiberboard, the invention is applicable to such mineral fiber products and will be particularly useful where, through operational difficulties, the mineral fiber blanks are found to possess greater than the desired air flow resistance. By practice of the present invention, it will be possible to reduce the air flow resistance of such drilled or otherwise perforated mineral fiber products and enhance their sound absorption efficiency.

While in the specification reference has been made to delamination and opening of the fibers and this has been illustrated in the reproduction of the photographs of Figure 5, it will be recognized that in a product of the nature of an open porous fibrous sound absorption material, the exact nature of the mechanical alteration of the structure of the product will not be clear always. It is possible, however, with the apparatus described in conjunction with Figure 6 above to determine air flow resistance, and the fiber disruption operation can be so adjusted that the desired air flow resistance is attained in any particular product to be processed.

Commercially it will be desirable to perform the method with a mechanically operated gang punch as mentioned above. However, the method can be practiced successfully by hand, using a punch and a mallet and disrupting the fibrous structure to the desired extent by inserting the punch into the perforations one at a time, or a few at a time with a small hand-held gang punch, and tapping the punch with a mallet to thrust the punch into the perforations or perforations and against the bottom wall thereof.

Round, flat-faced punches have been illustrated and described above. The punches may assume other shapes, such as square, hexagonal, triangular, or irregular cross-sectional shapes, and the faces may be altered to suit special requirements as will be described in conjunction with Figure 12. Where the entire tile is punched simultaneously in all of the desired drilled openings, there may be some tendency for the punches to warp the material; and to minimize this warpage, the pins 44 may be provided with sloping faces as indicated at 45, and the pins 46 may be provided with oppositely sloping faces as indicated at 47. (The pins are shown in Figure 12 in position above a perforated fibrous acoustical tile 48, prior to insertion.) This type of pin will tend to orient the fibers during the punching operation; and by proper choice of the number and positioning of the sloping faces of such pins, proper preferential fiber extrusion to correct for warpage due to general extrusion resulting from the punching operation may be effected.

I claim:

1. In a method of forming an acoustical material having improved sound absorption efficiency from a porous blank of matted cellulose fibers, the steps comprising drilling a plurality of holes in said blank extending from one face thereof substantially completely therethrough and thereafter reducing the air flow resistance of said drilled blank without substantial warpage of the blank by inserting into at least some of said drilled openings a plurality of pin punches having flat, sloping end faces extending in different directions to effect preferential fiber extrusion, and thrusting said punches into said drilled openings against the bottom walls thereof to delaminate and thereby open the fibrous structure of said material in the interior thereof in areas leading laterally from said drilled openings and effect said preferential fiber extrusion.

2. A method of improving the sound absorption efficiency of a porous fibrous acoustical material comprising matted cellulosic fibers having drilled openings therein comprising mechanically forcing the fibrous structure of the material apart in areas between the drilled openings by inserting into at least some of said drilled openings a plurality of essentially flat faced punches having a diameter about the same as the diameter of the drilled openings and forceably thrusting said punches downwardly into said drilled openings to provide openings extending laterally from the perforations for air flow to reduce the air flow resistance of the material significantly and thereby enhance sound absorption efficiency.

3. In a method of improving the sound absorption efficiency of a perforated fibrous acoustical material, the improvement which comprises mechanically forcing the fibrous structure of the material apart in areas between the perforations and therebelow by thrusting essentially flat faced punches into said perforations to a depth greater than the depth of said perforations and impacting the essentially flat faces against the material at the bottom thereof, and then withdrawing said punches to provide openings extending laterally from the perforations for air flow to reduce the air flow resistance of the material significantly and thereby enhance its sound absorption efficiency.

4. In a method of forming an acoustical material having improved sound absorption efficiency from a porous blank of matted fibers, the steps comprising drilling a plurality of holes in said blank extending from one face thereof substantially completely through the blank and thereafter mechanically forcing the fibrous structure of the material apart in areas between the perforations by inserting into at least some of said drilled openings a plurality of punches circular in cross section and having a diameter about the same as the diameter of the drills used to form the drilled openings, and thrusting said punches to the bottoms of said drilled openings with force to delaminate the fibrous structure and provide opening extending laterally from the perforations for air flow to reduce the air flow resistance of the material significantly and thereby enhance its sound absorption efficiency, in which at least some of said punches have a diameter smaller than the diameter of the drills used to form the drilled openings in the blank.

5. In a method of forming an acoustical material having improved sound absorption efficiency from a porous blank of matted fibers the steps of claim 4 in which at least some of said punches are essentially flat faced.

6. In a method of forming an acoustical material having improved sound absorption efficiency from a porous blank of matted cellulosic fibers, the steps comprising drilling a plurality of holes in said blank extending from one face thereof toward the opposite face but not completely through the blank and thereafter mechanically forcing the fibrous structure of the material apart in areas between the perforations by supporting said drilled blank on a rigid support and rapidly thrusting into at least some of said drilled openings a plurality of non-pointed punches to bring said punches against the bottoms of said drilled openings to delaminate the fibrous structure and provide openings extending laterally from the perforations for air flow to reduce the air flow resistance of the material significantly and thereby enhance its sound absorption efficiency.

7. In a method of forming an acoustical material having improved sound absorption efficiency from a porous blank of matted cellulosic fibers, the steps comprising drilling a plurality of holes in said blank extending from one face thereof substantially completely therethrough and thereafter mechanically forcing the fibrous structure of the material apart in areas between the perforations by inserting into at least some of said drilled openings a plurality of round pin punches having flat, sloping end faces, and thrusting said punches to the bottom of said drilled openings with force to delaminate the fibrous structure of said material and provide openings extending laterally from the perforations for air flow to reduce the air flow resistance of the material significantly and thereby enhance its sound absorption efficiency.

8. A method of improving the sound absorption efficiency of a perforated fibrous acoustical material comprising mechanically delaminating the fibrous structure of said material in areas between the perforations to provide openings extending laterally from the perforations for air flow to reduce the air flow resistance of the material significantly and thereby enhance its sound absorption efficiency.

9. A method as defined in claim 8 wherein the perforated openings in the porous fibrous acoustical material are drilled openings.

10. A method of improving the sound absorption efficiency of a porous fibrous acoustical material having drilled openings therein comprising mechanically delaminating the fibrous structure of the material in areas between the drilled openings by inserting punching means into at least some of said drilled openings and applying force thereto to delaminate the fibrous structure of the material and thereby provide openings extending laterally from the perforations for air flow to reduce the air flow resistance of the material significantly and thereby enhance the sound absorption efficiency.

11. In a method of forming an acoustical material having improved sound absorption efficiency, the steps of claim 10 in which at least some of said punches have a diameter smaller than the diameter of the drills used to form the drilled openings in the blank.

References Cited in the file of this patent

UNITED STATES PATENTS

| | | |
|---|---|---|
| 1,665,764 | York | Apr. 10, 1928 |
| 2,355,454 | Lucius | Aug. 8, 1944 |
| 2,615,525 | Berner | Oct. 28, 1952 |
| 2,684,093 | Enzmann et al. | July 20, 1954 |
| 2,734,297 | Dunklee | Feb. 14, 1956 |